United States Patent [19]

Christiansen

[11] 4,253,165

[45] Feb. 24, 1981

[54] APPARATUS FOR CONTROLLING AN AUTOMATIC ANGLING MACHINE CONNECTED TO AN ECHO SOUNDER

[76] Inventor: Thorbjorn N. Christiansen, P.O. Box 54, 8400 Sortland, Norway

[21] Appl. No.: 8,810

[22] Filed: Feb. 2, 1979

[30] Foreign Application Priority Data

Feb. 3, 1978 [NO] Norway ................................ 780382

[51] Int. Cl.³ .............................................. G01S 15/88
[52] U.S. Cl. ............................................ 367/96; 43/4; 43/26.1; 367/106; 367/108
[58] Field of Search ............... 367/96, 106, 108; 43/4, 43/26.1

[56] References Cited

U.S. PATENT DOCUMENTS

| | | | |
|---|---|---|---|
| 3,528,053 | 9/1970 | Rubin | 367/108 |
| 3,539,978 | 11/1970 | Stedtnitz | 367/108 |
| 3,588,795 | 6/1971 | Linardos et al. | 367/108 |
| 3,922,808 | 12/1975 | Rieth et al. | 43/4 |

*Primary Examiner*—Richard A. Farley
*Attorney, Agent, or Firm*—Sughrue, Rothwell, Mion, Zinn & Macpeak

[57] ABSTRACT

An angling machine is electronically controlled with a digital indication of the fishing depth by counting the number of revolutions of the winder or reel spool of the machine. The apparatus comprises a converter for connection to the transmitter and the receiver of an echo sounder, a pulse generator and a plurality of counters being included in the converter for indicating the actual depth as determined by the time interval between two signals from said transmitter and said receiver, respectively, and a plurality of comparators coupled to respective ones of said counters for comparing the counts thereof with the counts of the counters indicating the fishing depth. The angling machine has circuit means controlling the fishing functions thereof by correspondence between the counts of the respective, corresponding counters.

3 Claims, 4 Drawing Figures

APPARATUS FOR CONTROLLING AN AUTOMATIC ANGLING MACHINE CONNECTED TO AN ECHO SOUNDER

The present invention relates to an apparatus for controlling an automatic angling machine connected to an echo sounder, said angling machine being electronically controlled and providing a digital indication of the fishing depth by counting the number of revolutions of the line winder of the machine.

More specifically the invention is intended for echo sounder control of the fishing depth of an angling or fishing machine constructed for automatic "jigging" and "bobbing" type of fishing. A known construction of such a fishing machine comprises a line reel or winder driven by an electric motor and a clutch for connection and disconnection of the different functions, the machine being provided with control circuits and with a depth pointer and a plurality of switches for connection of desired operations and fishing functions. The machine is arranged to start fishing on a certain set fishing depth, it has an automatic hauling function starting at a certain line load, and with a suitable switch position it will provide for automatic "stop in the water surface", that is, the machine stops when the fishing tackle has been hauled to the water surface. For a closer description of such a fishing machine reference is made to U.S. Pat. No. 3,365,833.

When the fishing machine has been set at a desired fishing depth by means of the depth pointer, the machine will begin fishing (jigging or bobbing) in accordance with the set switch position. If one wants to fish near the bottom, the distance of the sinker from the bottom may be adjusted at will by carrying out a sequence of manual operations by means of the depth pointer. If in spite of varying bottom depth, one wants to fish at the same distance from the bottom, the operator must carry out the same manual operations each time one changes fishing place and the bottom depth changes. It would, however, be a substantial advantage if such adjustments could be carried out automatically, so that one was not dependent on operator work for said operations.

The object of the present invention is to provide an apparatus enabling echo sounder control of an automatic angling machine, so that it is ensured that the machine will fish at a desired distance above the bottom even if the bottom depth increases or decreases.

According to the invention there is provided an apparatus for the stated purpose which comprises a converter adapted for connection to the transmitter and receiver of the associated echo sounder, a pulse generator included in the converter, a plurality of counters included in the converter for indicating the actual depth as determined by the time interval between two signals from said transmitter and receiver, respectively, and a plurality of comparators coupled to respective ones of said counter for comparing the counts thereof with the counts of the counters indicating the fishing depth, the fishing machine having circuit means controlling the fishing functions thereof by correspondence between the counts of the respective, corresponding counters.

The invention will be described more closely in the following in connection with an exemplary embodiment with reference to the accompanying drawings, wherein.

Figure 1:
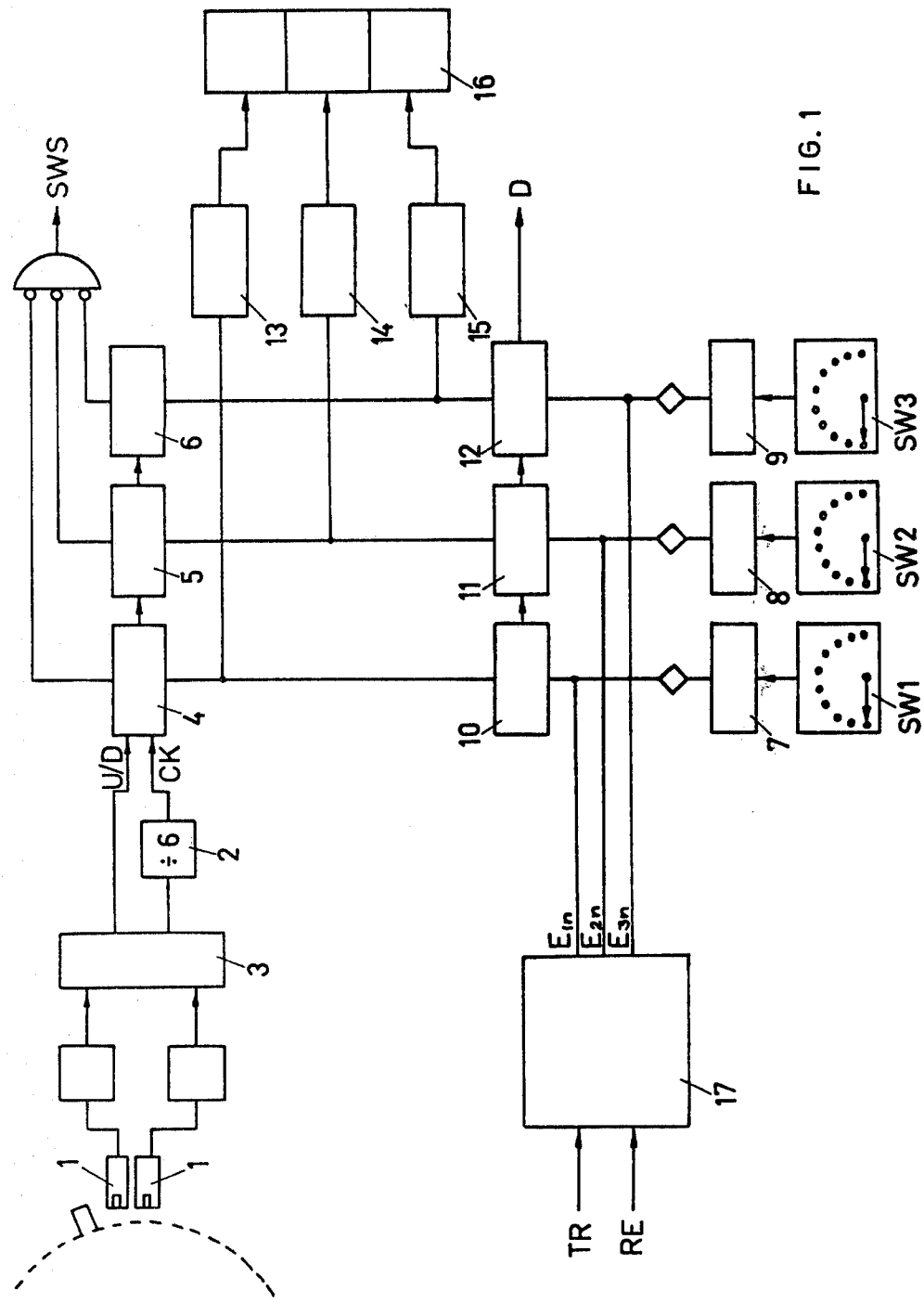
FIG. 1 shows a block diagram of depth automatic control circuits of an electronically controlled fishing machine and a converter device connected thereto for echo sounder control of the machine.

As schematically illustrated in FIG. 1, a pair of sensors 1 is arranged in connection with the winder or reel axis of the fishing machine, which sensors deliver a signal for each half revolution of the reel. The circumference of the reel is ⅓ fathoms, and by means of divider circuit 2 carrying out division by 6, one then obtains a clock pulse signal CK for each fathom the fishing tackle moves in the sea. As shown this signal is supplied to the counter inputs of three counters 4, 5, 6 which are up/down counters of BCD type, i.e. which indicate their count in binary coded decimal format.

As sensors there may, e.g. be used a pair of miniature voltage connected oscillators (MVSO), and these are mounted close to each other to detect if the reel goes up or down. A flip-flop 3 is provided to switch from up to down or vice versa. When the reel rotates in the same direction, the flip-flop stands in the same position, and if the reel direction is reversed, the flip-flop switches over and delivers an up/down signal (U/D) to the up/down input of the counters 4, 5, 6. Thus, a correct detection or recording of the fishing tackle in the sea is achieved.

The desired fishing depth is manually set by means of three switches SW1, SW2 and SW3, one switch for each digit in the three-digit number indicating the depth. The settings or positions of the switches are processed in respective coders 7, 8 and 9 delivering output signals in BCD code. The output signals are supplied through three-condition logic circuits to respective comparators 10, 11, 12 and are compared therein with the output signals from the depth counters 4, 5 and 6 of the fishing machine. When the line winder or reel rotates and the counters come to the number on which the switches are set, the last comparator, that is the comparator 12, delivers a signal D indicating that the fishing tackle has reached the desired depth, there being then correspondence between the setting of the switches and the depth counters. This signal is amplified and energizes the clutch of the fishing machine, and this is connected and starts hauling of the line. When the clutch has hauled one fathom upwards, the counters delivers a numeral back to the comparators, and the signal current to the clutch is interrupted. (The clutch itself is energized in accordance with the setting of the "bobbing" length).

As illustrated schematically in FIG. 1, the BCD code of the counters 4, 5, 6 is supplied to a respective decoder 13, 14 and 15 converting the BCD-code to 7-segment code. The output signals of the decoders are supplied to a display device 16 with indicators showing on which numbers the depth counters are set.

According to the invention the signals from an echo sounder is utilized to control the fishing machine so that the machine is always fishing at the same distance from the bottom. The above mentioned switches are thus replaced by the signals from the echo sounder, the signals being processed by means of a converter 17 which is connected as shown in FIG. 1.

Figure 2:
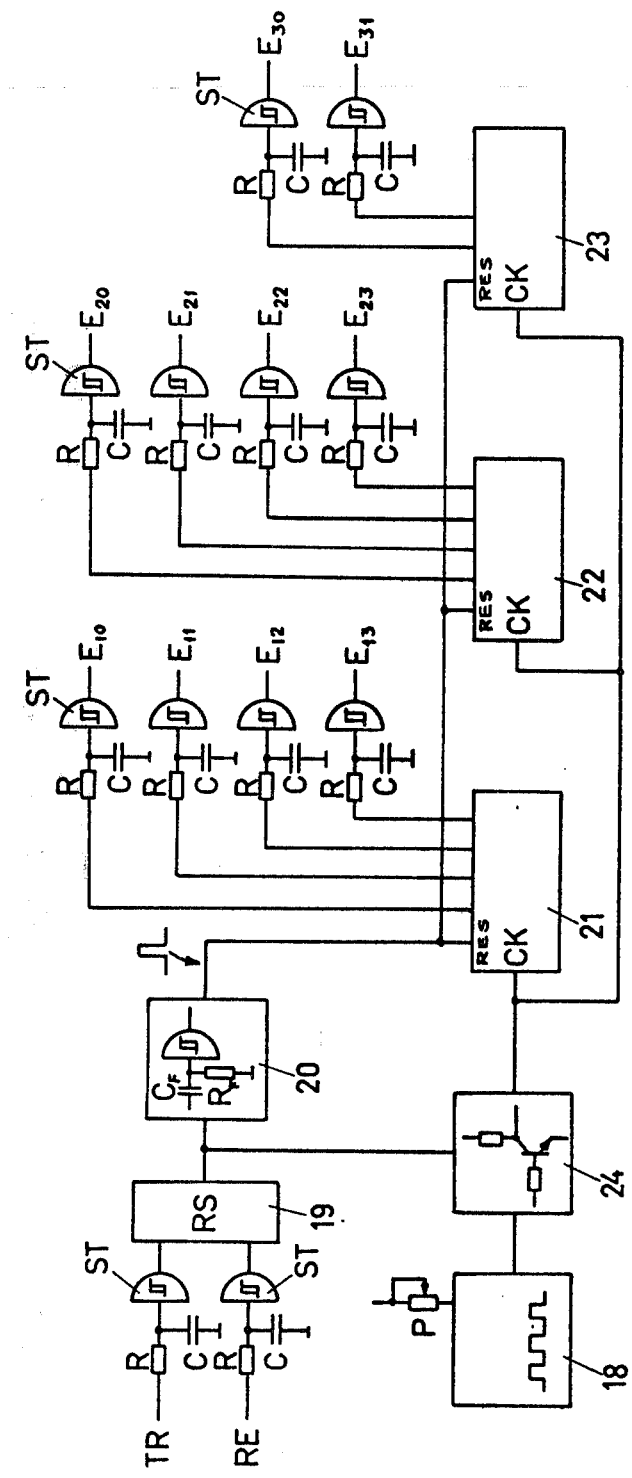
FIG. 2 shows a circuit diagram of the converter in FIG. 1.

FIG. 2 shows a circuit diagram of an embodiment of the converter 17 in FIG. 1. The converter includes a pulse generator 18 delivering an output signal having a frequency which is equal to half the number of fathoms travelled by the sound in water per second, as the sound has to go down to the bottom as well as back again. It should here be noted that even if it is referred to the length unit fathoms in connection with the described fishing machine, one might also have referred to another suitable length unit, for example meters. The pulse frequency is adjustable about said value, and in the illustrated embodiment a potentiometer P is used to adjust the frequency up or down. From the echo sounder (not shown) of the fishing vessel a pulse signal is taken from the transmitter TR of the echo sounder and a pulse signal from its receiver RE. The time interval between these signals is proportional with the bottom depth. Each of said signals is supplied through a RC link and a Schmitt trigger ST to a RS-latch 19 which is firstly connected through a highpass filter 20 to the reset inputs RES of three BCD counters 21, 22 and 23, respectively, and secondly is connected to the clock inputs CK of the counters by way of a gate circuit 24 on the output of the pulse generator 18. Upon reception of the transmitter pulse the output of the RS-latch is brought to "1" and the counters 21-23 are then reset. With the output of the RS-latch on "1" the pulses from the pulse generator 18 are simultaneously passed to the clock inputs CK of the counters through the gate circuit 24. When the receiver pulse from the receiver of the echo sounder is received, the output of the RS-latch is brought to "0" and thereby the path from the pulse generator to the counters is blocked. The number on which the counters is positioned at this time, is equal to the depth on the place in question.

Such as shown in FIG. 2, a RC link and a Schmitt trigger ST is connected on each counter output. The RC links are arranged to ensure that the outputs of the counters do not change during the counting, whereas the Schmitt triggers ensure that the outputs are either at "1" or "0" and never at an intermediate level. As illustrated, each of the counters 21 and 22 representing the one- and ten-digit places, respectively, has four outputs $E_{10}-E_{13}$ and $E_{20}-E_{23}$, respectively, to be able to indicate the numbers 0-9 in binary code, whereas the counter 23 representing the 100-digit place, has only two outputs $E_{30}$ and $E_{31}$. This is due to the fact that the converter in the illustrated embodiment is intended for use in connection with a fishing machine wherein the maximum fishing depth is not to exceed 399 fathoms.

When fishing with a fishing machine of the described type which is provided with the aforementioned equipment, the operation is as follows:

When the echo sounder is turned on, the echo sounder converter will position itself on the actual depth, e.g. 50 fathoms. One starts the fishing machine and lets out the line from the line winder. When the fishing tackle reaches the bottom, the display device of the machine may, e.g. show 48 fathoms. In a manner corresponding to that described above, the clutch of the fishing machine is not energized until there is correspondence between the depth counters and the counters of the converter, so that fishing is not obtained until the machine shows equally much as the echo sounder. The pulse generator frequency is then adjusted somewhat lower with the potentiometer P of the pulse generator. The counters in the converter of the echo sounder will then show a little less until they show 48 fathoms, and the fishing machine is then connected and starts fishing. As one wants to fish (jig) at a distance above the bottom, one adjusts the potentiometer a little so that one fishes at the desired distance above the bottom. Under control of the echo sounder the machine is thereafter fishing at the set distance from the bottom even if the depth changes up or down. An adjustment of the potentiometer P is not necessary the next time the line is let out.

It will be clear that also more than one fishing machine may be controlled simultaneously by means of the above described equipment.

Additional circuit details of the equipment described above, are shown in FIGS. 3-5. In these Figures the same reference numerals are used as for corresponding components in FIG. 1.

Figure 3:
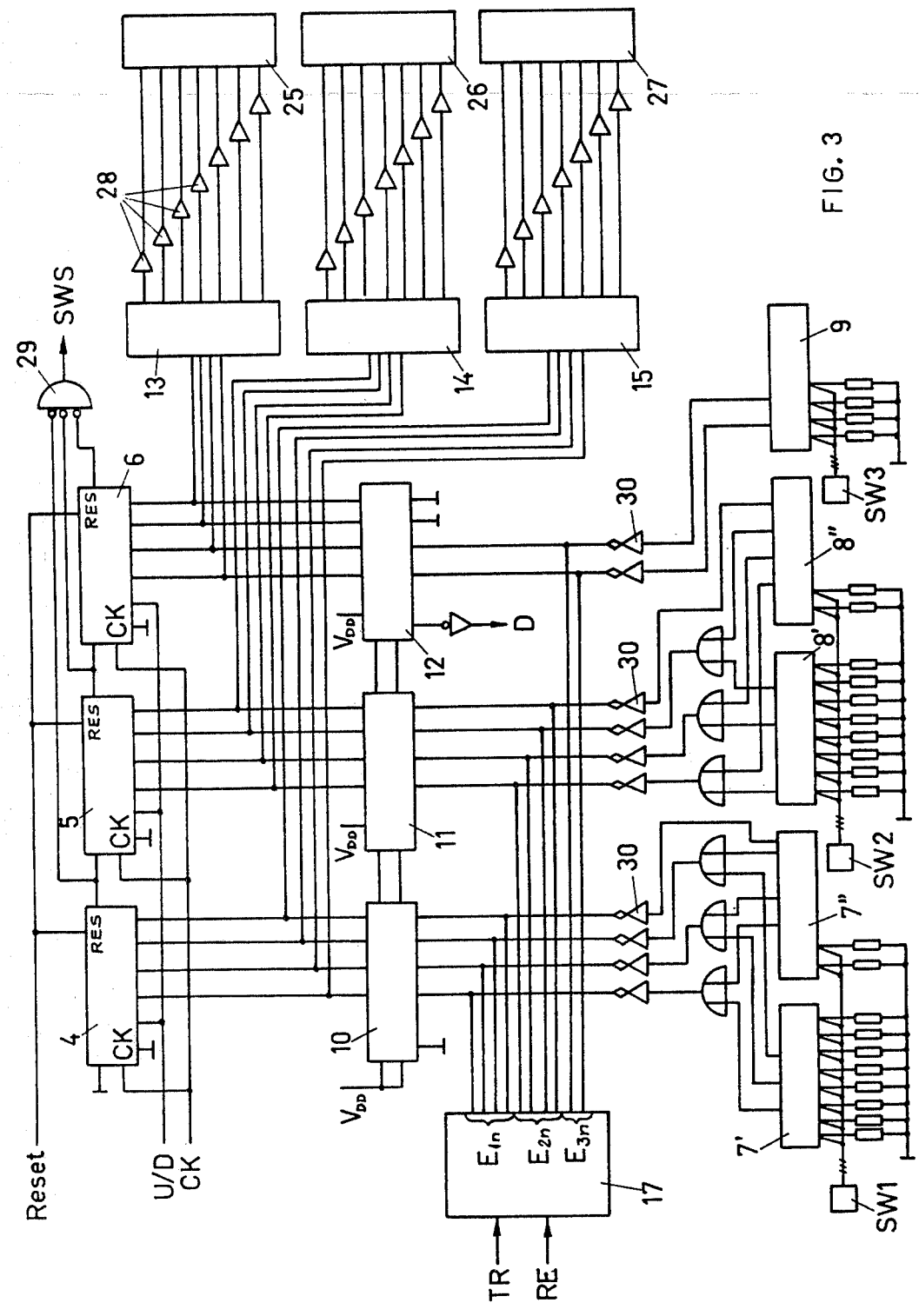
FIG. 3 shows a more detailed block diagram of parts of the arrangement in FIG. 1.

In FIG. 3 is shown how the up/down signals U/D and the clock signals CK are supplied to the counters 4, 5 and 6, and how the four outputs of the counters are connected to the comparators 10-12 and the decoders 13-15 for the display device 16. This device is here shown to be divided in three indicator units 25, 26, 27 to the inputs of which the respective seven outputs of the decoders are connected through indicator drivers generally designated 28. As illustrated, the counters 4, 5, 6 have a common reset line (Reset) and respective outputs whic through a NAND gate 29 delivers a signal SWS for the function "stop in the water surface" mentioned in the beginning.

As shown in FIG. 3, each of the coders 7 and 8 stating the digit on the one- and ten-place, respectively, of the set number, are divided into two coder elements 7′, 7″ and 8′, 8″, respectively, so that integrated circuit elements of commercially available type may be used as coder elements. The switches SW1-SW3 are only shown schematically, and it should be noted that from each of the switches there extends a number of leads corresponding to the number of switch positions, and that each switch supplies a suitable voltage to the lead on which the switch is positioned. The outputs of the coder 9 are connected to the associated comparator 12 by way of drive circuits 30 whereas certain of the ouputs of the coders 7 and 8 as illustrated are coupled to corresponding drive circuits 30 after combination in an OR gate circuit arrangement.

Figure 4:
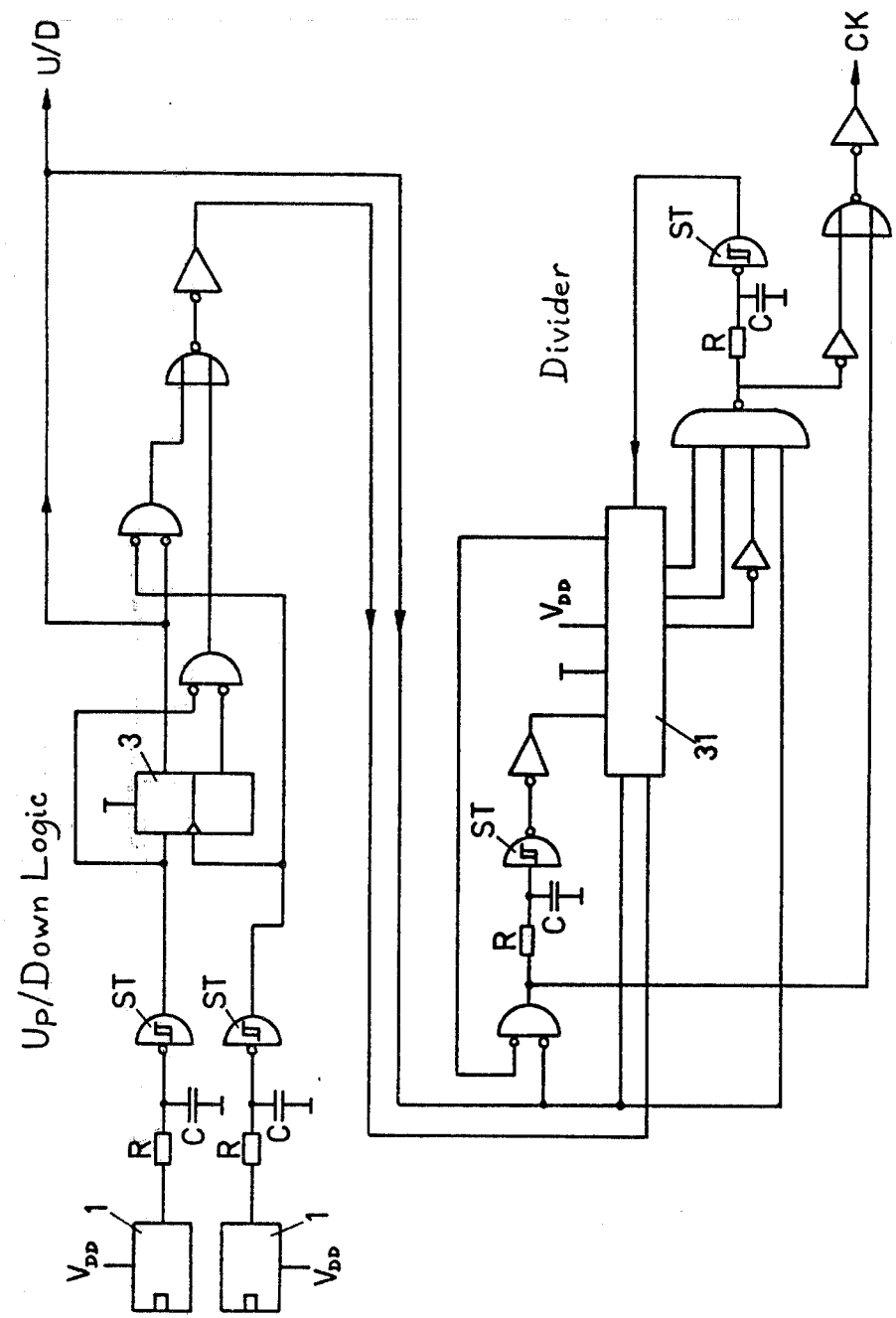
FIG. 4 shows a circuit diagram of a logic and a divider circuit included in the block diagram in FIG. 1.

FIG. 4 shows a circuit diagram of the up-down logic circuit and the divider circuit in FIG. 1. As shown the signals are supplied from the sensors 1 through RC links and Schmitt triggers to the flip-flop 3 which delivers the up/down signals U/D, and to a gate circuit arrangement wherefrom the signal after amplification is supplied to a counter 31 included in the divider circuit and from which the clock signal CK for the counters 4, 5 and 6 is produced by way of additional gate circuits and amplifier stages. A closer description of the connection and the individual circuit components is not to be included herein as the construction and operation of the circuit will be understood by a person skilled in the art. The counter 31 is suitably of the same type as the counters 4-6 and may be a standard circuit of commercially available type. The same is the case with the mentioned comparators, coders and indicator elements.

I claim:

1. In an apparatus for controlling an automatic angling machine by connection to an echo sounder, said angling machine being an electronically controlled still fishing machine for automatic "jigging" and "bobbing" type of fishing, and including a plurality of first counters (4, 5, 6) for digitally indicating the fishing depth by counting the number of revolutions of a winder of the machine, and said echo sounder having a transmitter and a receiver, the improvements comprising:
- a converter (17) connected to said transmitter and receiver of the echo sounder and including a pulse generator (18) having means (P) for adjusting its output frequency about a value corresponding to half the sound propagation velocity in water;
- a plurality of second counters (21, 22, 23) connected to said pulse generator for digitally indicating the actual depth as determined by the time interval between a start signal and a stop signal from said transmitter and receiver, respectively;
- a plurality of comparators (10, 11, 12) connected to respective ones of said first and said second counters for comparing the counts of the respective counters; and
- a circuit means for initiating the fishing operations of said angling machine in response to correspondence between the counts of the respective first and second counters.

2. An apparatus according to claim 1, wherein said converter comprises a reset circuit (19, 20) for automatic resetting of said second counters when receiving said start signal from the transmitter of said echo sounder, and means (24) for supplying the output signal of said pulse generator to said second counters simultaneously with said resetting, and blocking such supply when said reset circuit receives said stop signal from the receiver of said echo sounder.

3. An apparatus according to claims 1 or 2, wherein said second counters comprise three counters each delivering a respective output signal in BCD code, each output signal indicating a digit in a number representing the bottom depth.

* * * * *